United States Patent
Saba et al.

(10) Patent No.: US 8,121,070 B2
(45) Date of Patent: Feb. 21, 2012

(54) SECURITY SYSTEM FOR PORTABLE COMPUTER

(75) Inventors: Alberto José Rojas Saba, Morrisville, NC (US); Raymond Gary Octaviano, II, Raleigh, NC (US); James Stephen Rutledge, Durham, NC (US); David Benjamin Morgan, Chapel Hill, NC (US); Shane Christopher Branch, Raleigh, NC (US); Simon David Nicholas Taylor, Cary, NC (US); Sean Michael Ulrich, Morrisville, NC (US); Farrel David Benton, Raleigh, NC (US); James C. Salembier, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 1482 days.

(21) Appl. No.: 11/265,342

(22) Filed: Nov. 2, 2005

(65) Prior Publication Data

US 2007/0101135 A1 May 3, 2007

(51) Int. Cl.
*H04W 4/00* (2009.01)
*H04M 1/66* (2006.01)

(52) U.S. Cl. .......... 370/328; 455/410; 455/456.1
(58) Field of Classification Search ............ 713/1, 2, 713/151, 152, 193; 455/410, 404.2, 414.2, 455/411, 456, 456.1–457; 705/55; 726/1–36; 370/310, 328
See application file for complete search history.

(56) References Cited

U.S. PATENT DOCUMENTS

| | | | | |
|---|---|---|---|---|
| 5,483,244 A * | 1/1996 | Grube et al. | | 342/463 |
| 5,821,854 A * | 10/1998 | Dorinski et al. | | 340/539.21 |
| 5,999,126 A * | 12/1999 | Ito | | 342/357.1 |
| 6,166,688 A * | 12/2000 | Cromer et al. | | 342/357.17 |
| 6,647,497 B1 * | 11/2003 | Cromer et al. | | 726/16 |
| 6,975,941 B1 * | 12/2005 | Lau et al. | | 701/213 |
| 2002/0194500 A1 * | 12/2002 | Bajikar | | 713/201 |
| 2003/0048174 A1 * | 3/2003 | Stevens et al. | | 340/5.64 |

* cited by examiner

*Primary Examiner* — Lester Kincaid
*Assistant Examiner* — Daniel Lai
(74) *Attorney, Agent, or Firm* — John L. Rogitz

(57) ABSTRACT

A portable computer searches for preprogrammed wireless stations when it boots, and if it does not recognize any, stops booting the O.S. so that data cannot be accessed. In this way, should the portable computer be stolen and removed from its intended vicinity, data on the computer cannot be accessed by the thief.

4 Claims, 2 Drawing Sheets

SECURITY SYSTEM FOR PORTABLE COMPUTER

I. FIELD OF THE INVENTION

The present invention relates generally to computer security.

II. BACKGROUND OF THE INVENTION

Portable computers provide many conveniences, but are also relatively easy to steal owing to their portability. To trace a stolen computer, systems have been provided in which the computer is programmed to contact a monitoring service once a day when the computer is connected to a local area network or phone line. The information from the victim computer can then be provided to law enforcement for recovery.

As understood herein, such systems are effective only if the thief happens to connect the stolen computer to a phone line or other network connection. Until such connection is made, the thief can attempt to access information on the computer by hacking away at his leisure.

SUMMARY OF THE INVENTION

A computer includes a processor that executes a basic input-output system (BIOS). As BIOS executes, the computer searches for wireless stations that are in communication with the computer to determine, prior to completing the boot, whether any stations match one or more of a list of wireless stations that are pre-stored in the computer as being authorized. The boot is selectively completed based on the outcome.

In one implementation an operating system is booted if a wireless station is recognized and otherwise is not booted. The logic may send a position of the computer to a monitoring server if no wireless station is recognized.

In another aspect, a method includes allowing a computer with wireless communication capability to complete booting an operating system if it recognizes an authorized wireless communication station and otherwise not allowing the computer to complete the boot.

In still another aspect, a portable computer searches for preprogrammed wireless stations when it boots, and if it does not recognize any preprogrammed wireless station, stops booting an operating system such that, should the portable computer be stolen and removed from its intended vicinity, data on the computer cannot be accessed.

The details of the present invention, both as to its structure and operation, can best be understood in reference to the accompanying drawings, in which like reference numerals refer to like parts, and in which:

DETAILED DESCRIPTION OF THE PREFERRED EMBODIMENT

Figure 1:
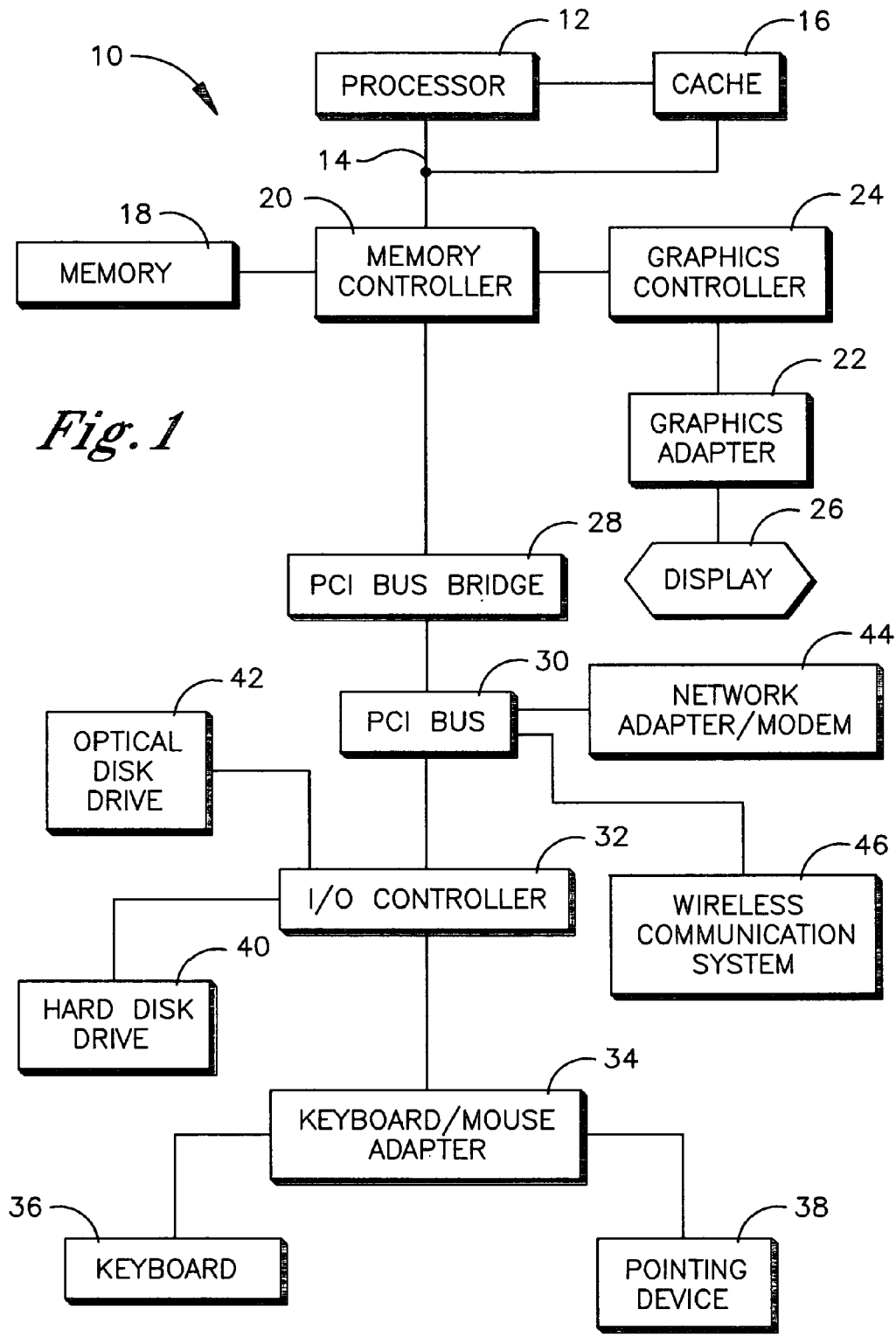
FIG. 1 is a block diagram of a non-limiting computer.

Referring initially to FIG. 1, a high-level block diagram of a data processing system, generally designated 10, is shown in which the present invention may be implemented. The system 10 in one non-limiting embodiment is a portable personal computer or laptop computer. The system 10 includes a processor 12, which may be, without limitation, a PowerPC processor available from Lenovo Corp. (or other processors made by, e.g., Intel or AMD and common to the industry). The processor 12 is connected to a processor bus 14, and a cache 16, which is used to stage data to and from the processor 12 at reduced access latency, is also connected to the processor bus 14. In non-limiting embodiments the processor 12 can access data from the cache 16 or from a system solid state memory 18 by way of a memory controller function 20. Also, the memory controller 20 is connected to a memory-mapped graphics adapter 22 by way of a graphic bus controller 24, and the graphics adapter 22 provides a connection for a monitor 26 on which the user interface of software executed within data processing system 10 is displayed.

The non-limiting memory controller 20 may also be connected to a personal computer interface (PCI) bus bridge 28, which provides an interface to a PCI bus 30. Connected to the PCI bus 30 may be an input/output (I/O) controller 32 for controlling various I/O devices, including, e.g., a keyboard/mouse adapter 34 which provides connection to a keyboard 36 and to a pointing device 38, which may be implemented by a mouse, trackball, or the like. Additionally, a hard disk drive 40 is connected to the I/O controller 32. If desired, an optical disk drive 42, such as a DVD or CD drive, can be connected to the I/O controller 32. In some implementations a network adapter 44 can be attached to the PCI bus 30 as shown for connecting the data processing system 10 to a local area network (LAN), the Internet, or both. Also, a wireless communication system 46 can be connected to the PCI bus 30 as shown to communicate wirelessly using, e.g., Bluetooth or Wi-Fi with nearby wireless communication stations in accordance with logic below. In any case, in accordance with principles known in the art, during power-on the processor 12 executes a basic input/output system (BIOS) program that may be stored in the memory 18, to load an operating system in the hard disk drive 40 into the memory 18 provided the logical test below is satisfied.

Figure 2:
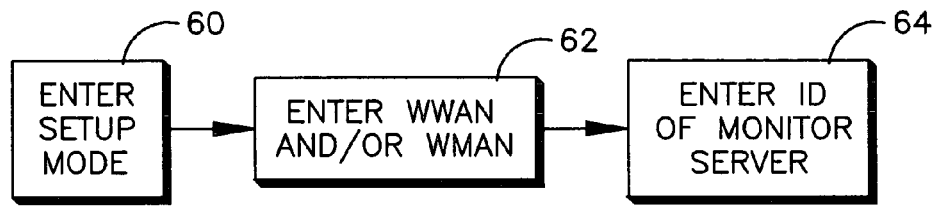
FIG. 2 is a flow chart of the set up logic.

Now referring to FIG. 2, commencing at block 60, the system administrator enters BIOS setup. At block 62, the identifications of preferably all wireless wide area network (WWAN) and/or wireless metropolitan area network (WMAN) base stations that are located in an approved area of use are recorded in the computer. The IDs can be entered by the administrator or all nearby stations located by the computer itself. At block 64, the administrator enters the identification, e.g., an IP address, of a monitoring server to which the computer is to report in accordance with the logic of FIG. 3.

Figure 3:
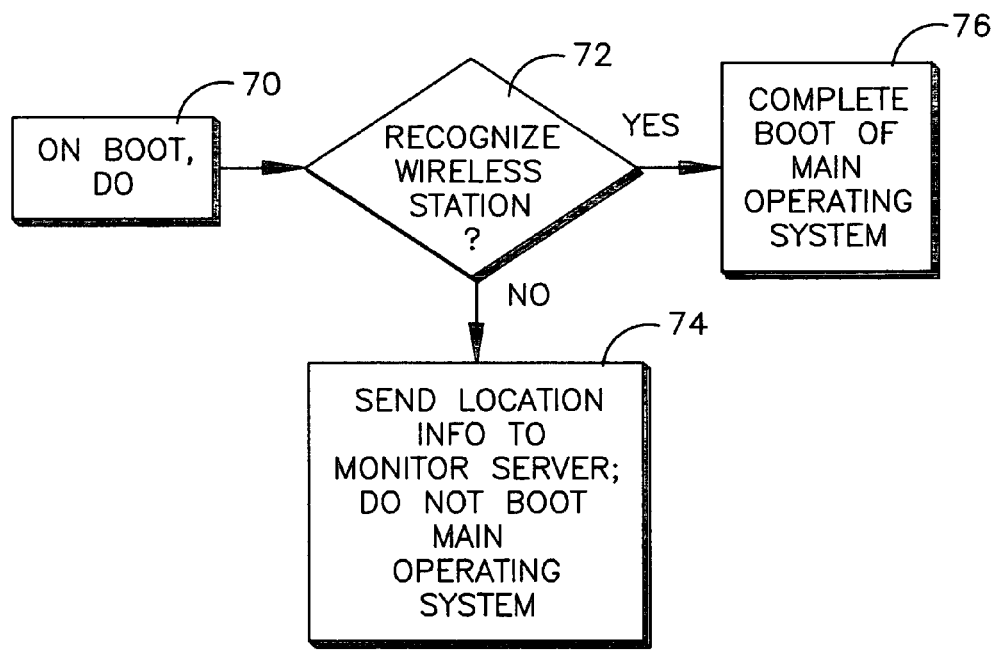
FIG. 3 is a flow chart of the operating logic.

Accordingly and now referring to FIG. 3 to illustrate the post set-up operational logic, at block 70, every time the computer is booted it searches for the stations identified during the set-up process described above. Decision diamond 72 indicates that the computer automatically determines whether it recognizes any wireless stations transparently to user control, i.e., the computer executes the logic without use prompt and indeed cannot be stopped from executing the logic by the user. If it does not recognize a station, it sends its location information to the monitoring server at block 74 via the nearest wireless station that is available, and then stops booting. In this way, the operating system is never fully booted, and a thief consequently cannot access data on the computer. The location information may be, without limitation, a location as determined by a GPS system on the computer or the ID of the wireless station with which the computer is communicating.

On the other hand, if the computer recognizes a wireless base station as matching one of the IDs entered in FIG. 2, then the process moves to block 76 to complete the boot of the main operating system (e.g., Windows®) according to normal booting operations.

The logic of FIG. 3 thus may be implemented in BIOS for execution by the processor of the computer, or it may be implemented in other appropriate systems that are invoked during power-on.

While the particular SECURITY SYSTEM FOR PORTABLE COMPUTER as herein shown and described in detail is fully capable of attaining the above-described objects of the invention, it is to be understood that it is the presently preferred embodiment of the present invention and is thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more". It is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. Absent express definitions herein, claim terms are to be given all ordinary and accustomed meanings that are not irreconcilable with the present specification and file history.

What is claimed is:

1. A computer including a processor executing a basic input-output system (BIOS) to undertake logic comprising:
   determining, prior to completing a boot, whether any fixed wireless base stations communicating with the computer have a base station identification that matches at least one wireless base station identification stored in the computer as being authorized; and
   selectively completing the boot based on the determining act, wherein an operating system is booted if a wireless station is recognized and otherwise is never fully booted.

2. The computer of claim 1, wherein the logic sends a position of the computer to a monitoring server if no wireless station is recognized.

3. A method comprising allowing a computer with wireless communication capability to complete booting an operating system if it recognizes an authorized fixed wireless communication base station and otherwise not allowing the computer to complete the boot.

4. The method of claim 3, comprising sending a position of the computer to a monitoring server if no wireless station is recognized.

* * * * *